US008756921B2

(12) United States Patent
Troxler et al.

(10) Patent No.: US 8,756,921 B2
(45) Date of Patent: Jun. 24, 2014

(54) REDUCTANT DELIVERY DEVICE

(75) Inventors: Paul J. Troxler, Bellingham, WA (US); Nathan J. Kaemingk, Lynden, WA (US)

(73) Assignee: PACCAR Inc, Bellevue, WA (US)

( * ) Notice: Subject to any disclaimer, the term of this patent is extended or adjusted under 35 U.S.C. 154(b) by 290 days.

(21) Appl. No.: 12/987,868

(22) Filed: Jan. 10, 2011

(65) Prior Publication Data
US 2012/0174561 A1    Jul. 12, 2012

(51) Int. Cl.
*F01N 3/00* (2006.01)
(52) U.S. Cl.
USPC .................................. 60/295; 60/274; 60/301
(58) Field of Classification Search
USPC .................................................... 60/274–324
See application file for complete search history.

(56) References Cited

U.S. PATENT DOCUMENTS

| | | | | |
|---|---|---|---|---|
| 5,829,248 | A * | 11/1998 | Clifton | 60/286 |
| 6,449,947 | B1 | 9/2002 | Liu | |
| 6,539,708 | B1 * | 4/2003 | Hofmann et al. | 60/286 |
| 6,722,124 | B2 * | 4/2004 | Pawson et al. | 60/286 |
| 7,730,721 | B2 * | 6/2010 | Kimura et al. | 60/286 |
| 8,079,211 | B2 * | 12/2011 | Levin et al. | 60/286 |
| 8,087,239 | B2 * | 1/2012 | Bugos et al. | 60/298 |
| 8,240,137 | B2 * | 8/2012 | Liu et al. | 60/295 |
| 2004/0103643 | A2 | 6/2004 | Megas | |
| 2008/0155973 | A1 | 7/2008 | Maruyama | |
| 2008/0202105 | A1 * | 8/2008 | Winter et al. | 60/295 |
| 2008/0223022 | A1 | 9/2008 | Amon | |
| 2008/0302088 | A1 | 12/2008 | Koehler | |
| 2009/0019843 | A1 | 1/2009 | Levin | |
| 2009/0044524 | A1 | 2/2009 | Fujino | |
| 2009/0064669 | A1 | 3/2009 | Mabuchi | |
| 2009/0266064 | A1 | 10/2009 | Zheng | |
| 2010/0005791 | A1 | 1/2010 | Ranganathan | |
| 2010/0170233 | A1 * | 7/2010 | Tangemann et al. | 60/299 |
| 2010/0212292 | A1 * | 8/2010 | Rusch et al. | 60/274 |

FOREIGN PATENT DOCUMENTS

JP    2009-150337 A    7/2009

OTHER PUBLICATIONS

International Search Report and Written Opinion mailed Aug. 27, 2012, issued in corresponding International Application No. PCT/US2012/020796, filed Jan. 10, 2012, 8 pages.

* cited by examiner

*Primary Examiner* — Jesse Bogue
(74) *Attorney, Agent, or Firm* — Christensen O'Connor Johnson Kindness PLLC

(57) ABSTRACT

Various diffusion apparatuses are provided for facilitating the injection of a nitrogen-oxides reductant solution, such as urea, into exhaust gas as part of a selective catalytic reduction system. These diffusion apparatuses direct exhaust gas from an exhaust pipe, through a conduit, and into a diffusion chamber where urea is injected. The flow of exhaust gas through the conduit provides improved transport of injected reductant solution into the exhaust pipe, and adhesion of the reductant solution to the walls of the diffusion chamber is reduced.

14 Claims, 6 Drawing Sheets

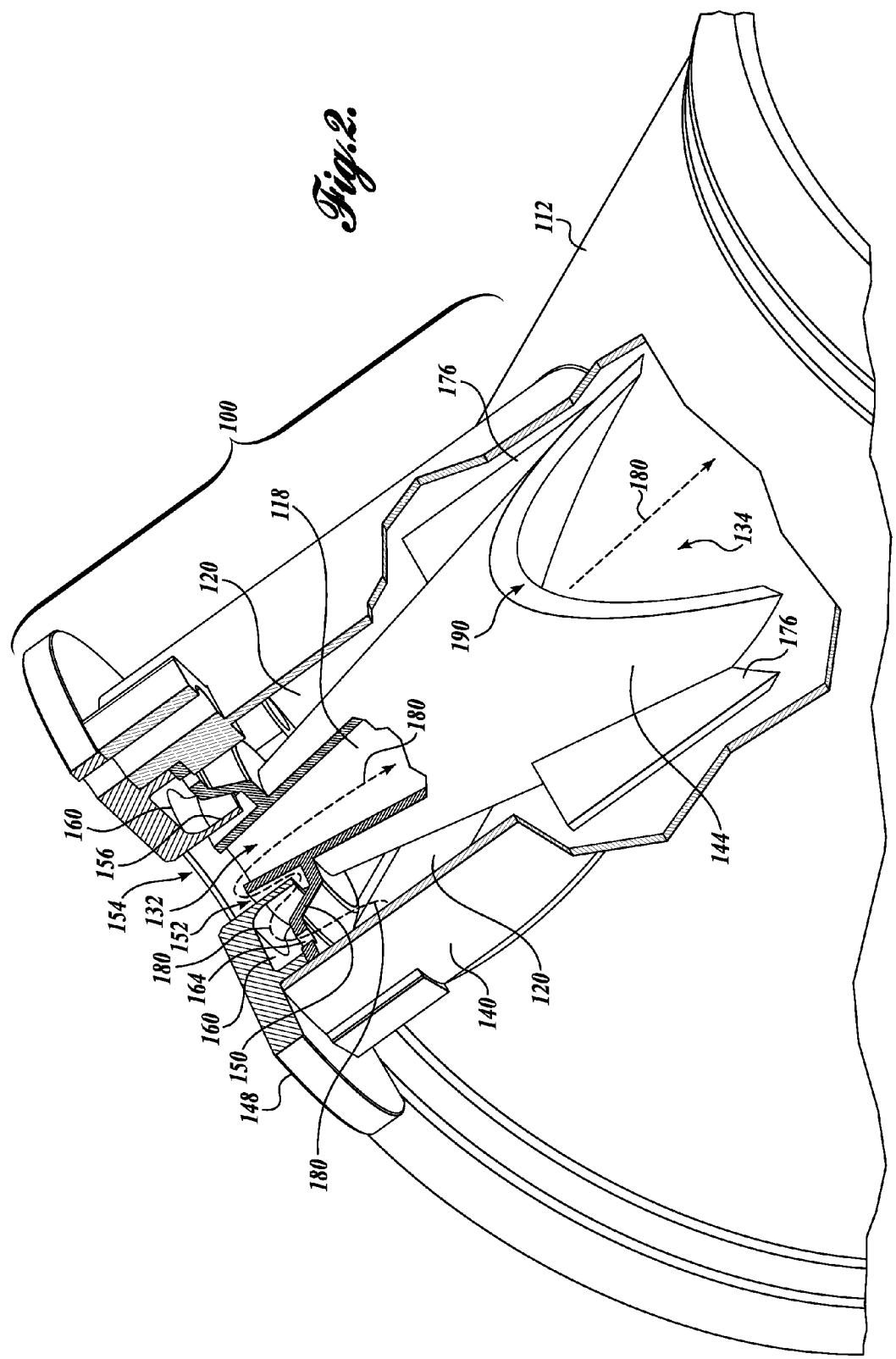

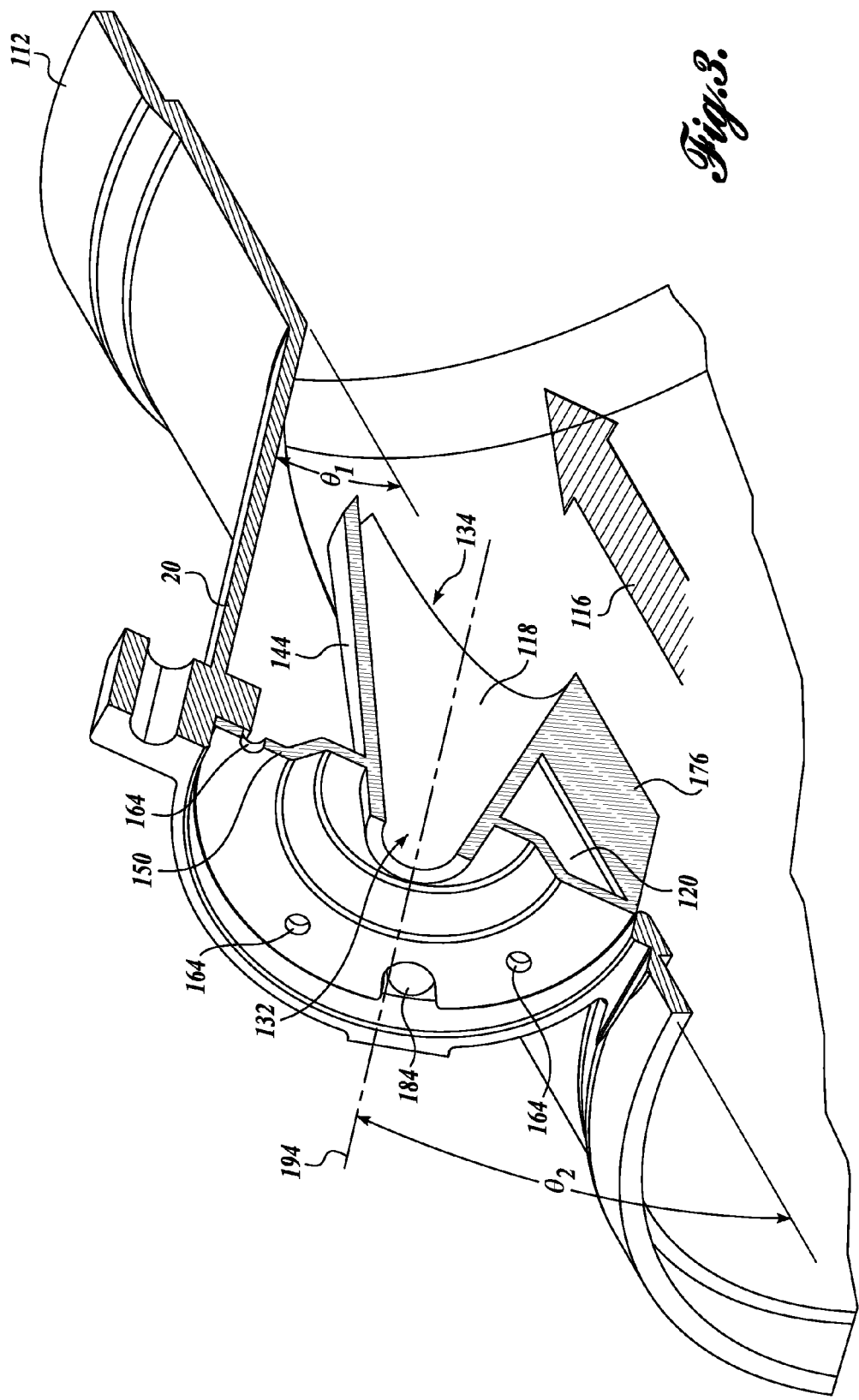

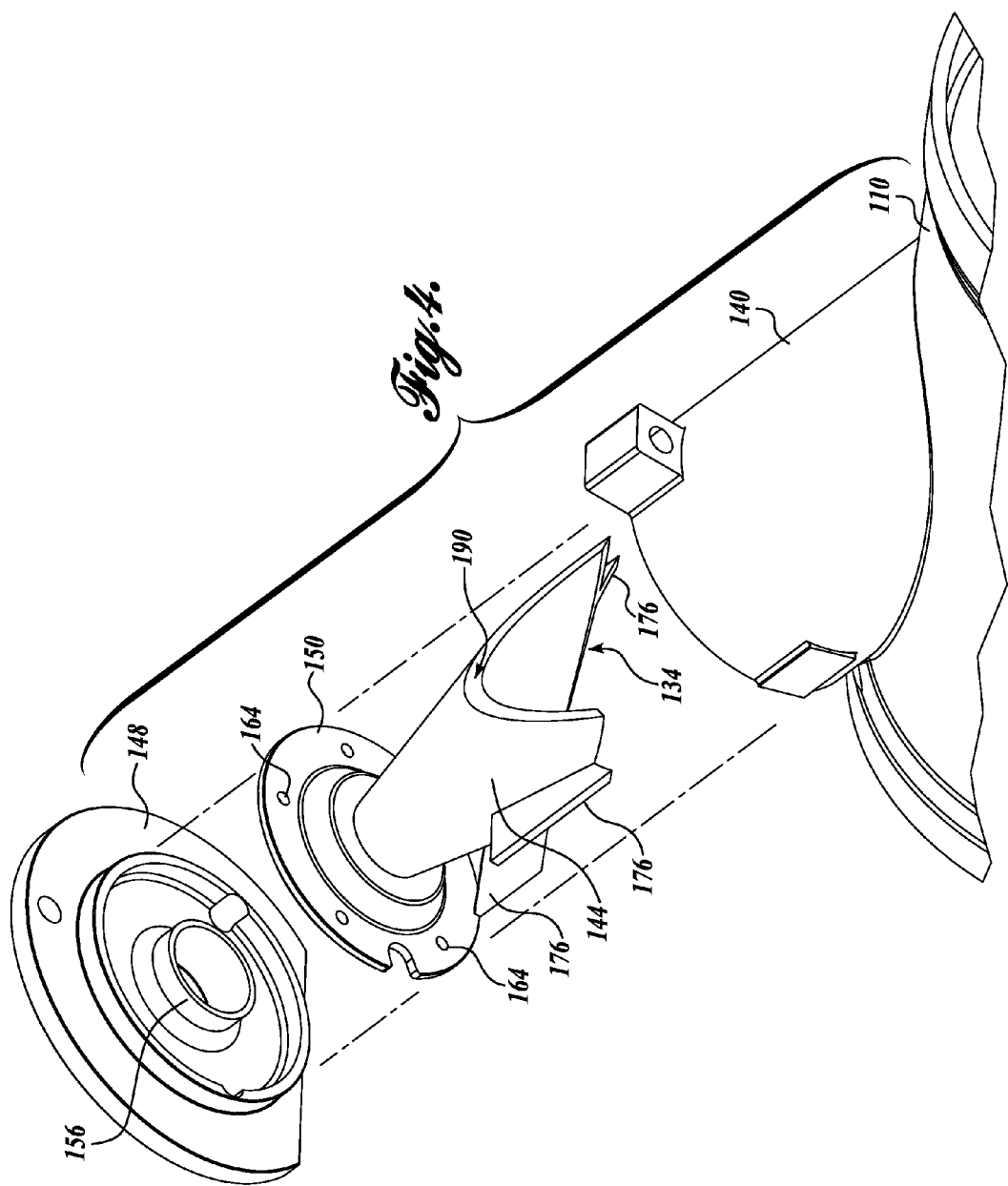

REDUCTANT DELIVERY DEVICE

BACKGROUND

Regulatory air-pollution limits for diesel engines have caused some manufacturers to adopt selective catalytic reduction (SCR) technology for reducing nitrogen oxides (NOx) in engine exhaust. The SCR process introduces an NOx reducing compound (e.g., a urea-water solution) into the hot exhaust gas, which chemically reduces NOx into non-pollutant compounds in conjunction with a catalyst. However, during typical operation of an engine, the conditions for the SCR process are not optimal (e.g., exhaust is too hot or cold) and either too much, or too little, urea solution is introduced into the exhaust. When urea solution is introduced that does not undergo the SCR process (e.g., too much urea solution for the exhaust temperature), urea crystals will accumulate within the exhaust system, both on the interior surface of the exhaust pipe and at the port that introduces the solution into the exhaust. Build up of urea crystals in the exhaust system detrimentally affects the performance of the exhaust system, and also is indicative of inefficiency in the SCR process: urea crystals represent both wasted urea solution and reduced SCR efficiency.

During injection of urea into the diesel exhaust stream during SCR there is a significant amount of the total urea injected that contacts the walls of the exhaust pipe and becomes a liquid wall film. While this process occurs, the urea that is wetting the pipe walls does not reach the catalyst for its intended use and the intended quantity of reactant is not available in the catalyst.

In order to provide the minimum required urea amount, during normal engine operation, the urea injector cycles on and off. While in operation, the aqueous urea solution is injected as a stream of small droplets. Effective management of these droplets requires injector geometries specifically intended to transport the droplets away from the injector and into the main pipe flow with minimal wall wetting.

Known methods for reducing wall wetting during urea injection include utilizing a urea "doser port" having a urea injector and a chamber that opens at the side of the main exhaust pipe, such as urea dosers manufactured by Bosch. A diagrammatic illustration of an exemplary prior art doser port 704 is illustrated in FIG. 7, wherein the doser port 704 comprises a urea doser 708 and a chamber 710 shaped to provide passage for injected urea 712 into an exhaust pipe 720. However, such doser designs do not eliminate the wall-wetting effect, particularly because exhaust flow 724 and 726 sometimes works against the doser port 704 by pushing the injected urea 712 into the walls of the doser port 704 (thus promoting wall wetting), as illustrated by exhaust flow 726.

For example, the main exhaust gas flow 724 and 726 cause the gas in the doser port 704 to move at high velocities. In turn, these high gas velocities push the urea droplets into the walls that define the chamber 710 (see, e.g., exhaust gas flow 726). A droplet that sticks to the wall forms a liquid film. Under certain temperature conditions, the wall film will then form undesirable urea crystals. Additionally, this configuration causes problems with the last droplets injected in an injection cycle. In that regard, at the end of an injection cycle, the last droplets are injected with decreasing velocity. As the injection velocity approaches zero, it is increasingly difficult for the droplets to reach the main exhaust pipe 720. Therefore, the last drops typically fall into the chamber 710 wall and form a film.

So as to at least reduce the above-described inefficiencies with regard to urea injection during an SCR process, a system not heretofore developed is needed, among others, to facilitate injection of liquid urea solution into an exhaust system while reducing wall-wetting effects.

SUMMARY

This summary is provided to introduce a selection of concepts, in a simplified form, that are further described below in the Detailed Description. This summary is not intended to identify key features of the claimed subject matter, nor is it intended to be used as an aid in determining the scope of the claimed subject matter.

In one aspect, a diffusion apparatus is provided that is configured to provide liquid communication between an injection port for injecting a reductant solution and an exhaust pipe connected to an engine that produces an exhaust flow, the diffusion apparatus comprising: a diffusion chamber configured to pass the reductant solution from the injection port to the exhaust pipe, the diffusion chamber having an inlet and an outlet, wherein the inlet is an opening configured to be in fluid communication with the injection port, and wherein the outlet is an opening configured to be in fluid communication with an interior of the exhaust pipe; and a conduit configured to direct a portion of the exhaust flow from the exhaust pipe to the inlet of the diffusion chamber.

In another aspect, a method is provided for providing a diffuse spray of a reductant solution for reducing nitrogen oxides in an exhaust flow, comprising: injecting a reductant solution into an opening and through an inlet of a diffusion chamber; and introducing a portion of the exhaust flow to the opening adjacent the inlet of the diffusion chamber.

DESCRIPTION OF THE DRAWINGS

The foregoing aspects and many of the attendant advantages of the claimed subject matter will become more readily appreciated by reference to the following detailed description, when taken in conjunction with the accompanying drawings, wherein:

FIG. 2 is a partial cut-away view of the diffusion apparatus and exhaust pipe portion of FIG. 1;

FIG. 3 is a longitudinal cross-sectional view of the diffusion apparatus and exhaust pipe of FIG. 2 with an upper baffle of the diffusion apparatus removed;

FIG. 4 is an exploded perspective view of the diffusion apparatus of FIGS. 2 and 3;

DETAILED DESCRIPTION

Figure 1:
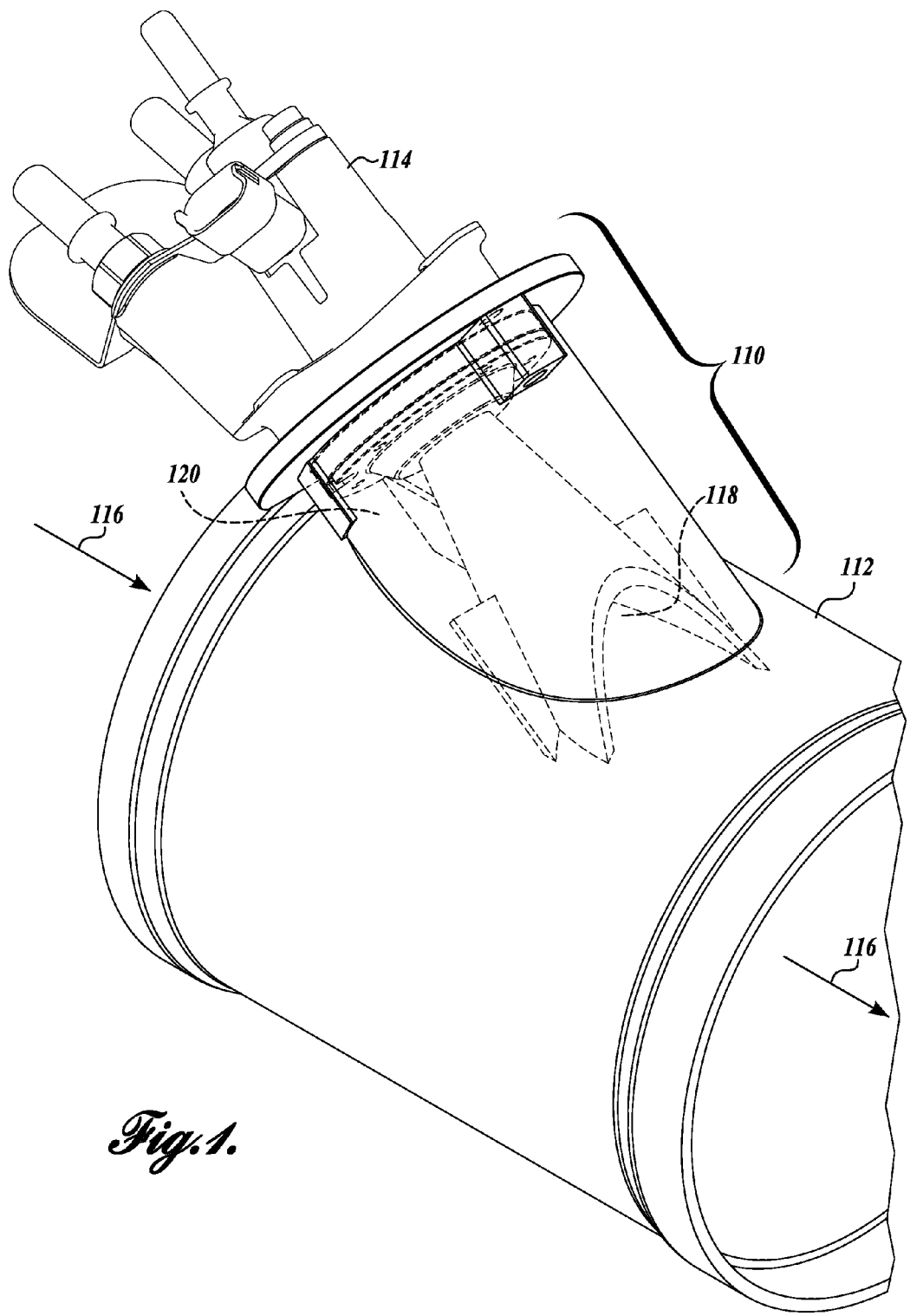
FIG. 1 is a perspective view of one example of a diffusion apparatus formed in accordance with aspects of the present disclosure, the diffusion apparatus shown integrated with a portion of an exhaust system comprising a portion of a selective catalytic reduction system.

The detailed description set forth below in connection with the appended drawings is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the invention to the precise forms disclosed. Similarly, any steps described herein may be interchangeable with other steps, or combinations of steps, in order to achieve the same or substantially similar result.

Embodiments of the present disclosure are directed to diffusion apparatuses for facilitating the injection of a nitrogen-oxides reductant solution, such as urea, into exhaust gas as part of a selective catalytic reduction system. Embodiments of the diffusion apparatus direct exhaust gas from an exhaust pipe, through a conduit, and into a diffusion chamber where urea is injected. The exhaust gas that flows through the conduit and is introduced to the injected urea provides improved transport of injected reductant solution into the exhaust pipe, and adhesion of the reductant solution to the walls of the diffusion chamber is reduced.

While urea is presently a preferred reductant used in the automotive industry for reducing nitrogen oxides in exhaust, the present disclosure is not limited to apparatus for use in injecting a urea solution. Other nitrogen-oxides reductant solutions (e.g. ammonia) will benefit from injection using the provided examples of the diffusion apparatus. Furthermore, the provided examples are not limited to the injection of a nitrogen-oxides reductant solution, but are useful for providing passage between any liquid injector and a gaseous flow.

Although exemplary embodiments of the present disclosure will be described hereinafter with reference to over-the-road vehicles, particularly diesel-powered, heavy-duty trucks, it will be appreciated that aspects of the present disclosure have wide application, and therefore, may be suitable for use with many other types of vehicles that include a urea or other nitrogen-oxides reductant injection system for treating nitrogen oxides emissions in an exhaust stream, such as automobiles, recreational vehicles, boats, etc. Examples of the subject matter of the present disclosure may find other applications, such as the treatment of exhaust streams of stationary or portable generators, diesel powered pumps, etc. Accordingly, the following descriptions and illustrations herein should be considered illustrative in nature, and thus, not limiting the scope of the claimed subject matter.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known aspects have not been described in detail in order to not unnecessarily obscure various aspects of the present disclosure. Further, it will be appreciated that embodiments of the present disclosure may employ any combination of features described herein.

Figure 5A:
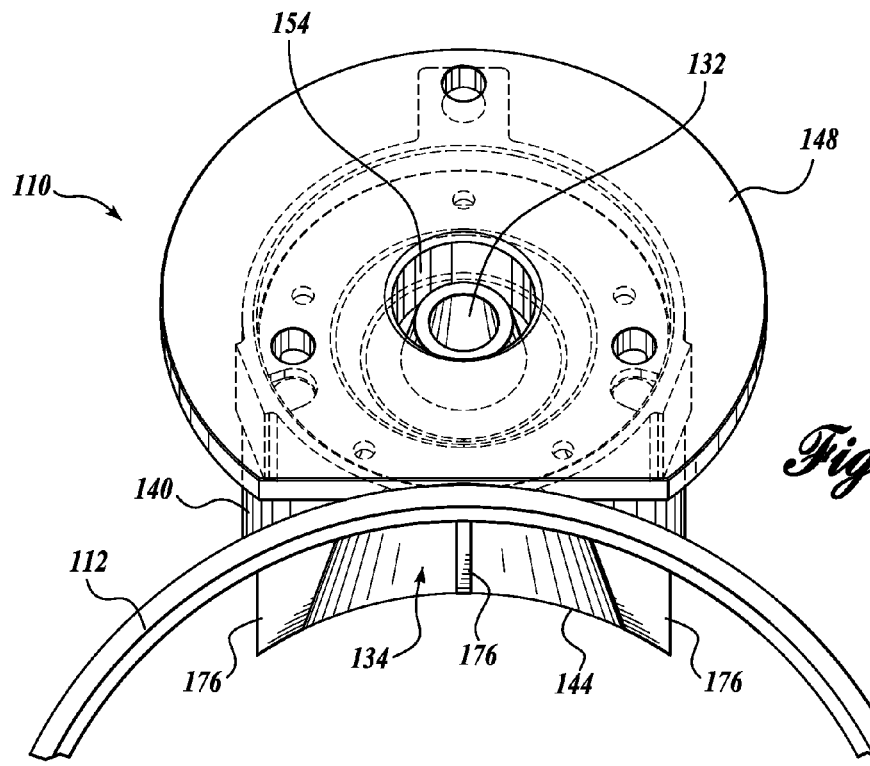
FIGS. 5A and 5B are end views of the diffusion apparatus shown in FIG. 2.
Figure 5B:
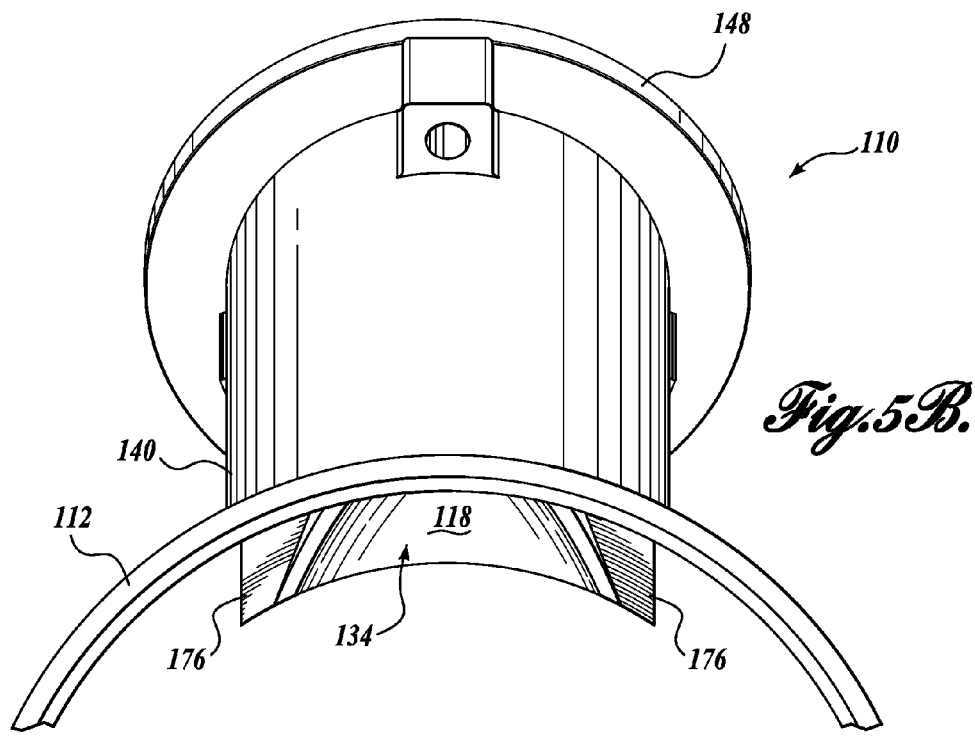
Figure 6:
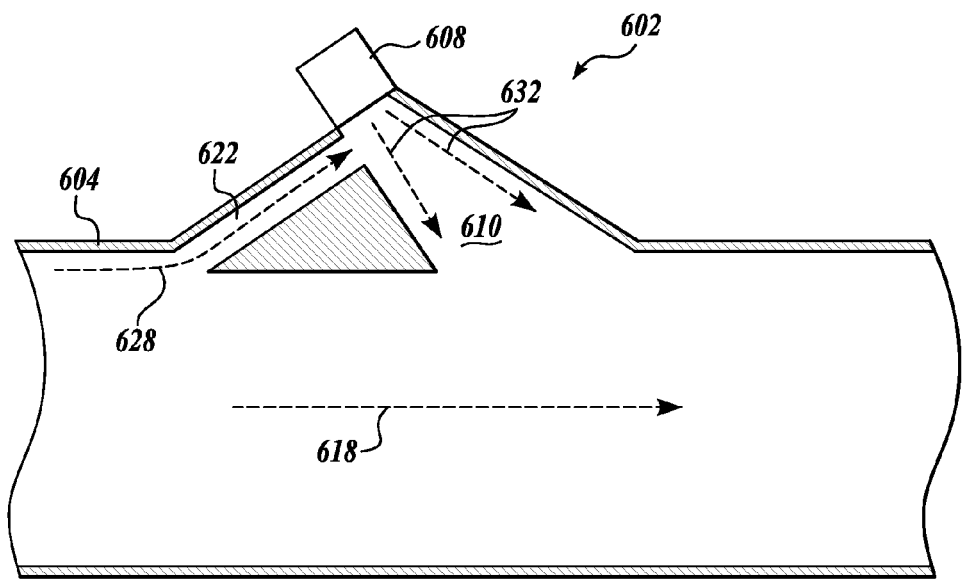
FIG. 6 is a diagrammatic representation of a urea doser port in accordance with embodiments of the present disclosure, the urea doser port mounted onto an exhaust pipe.
Figure 7:
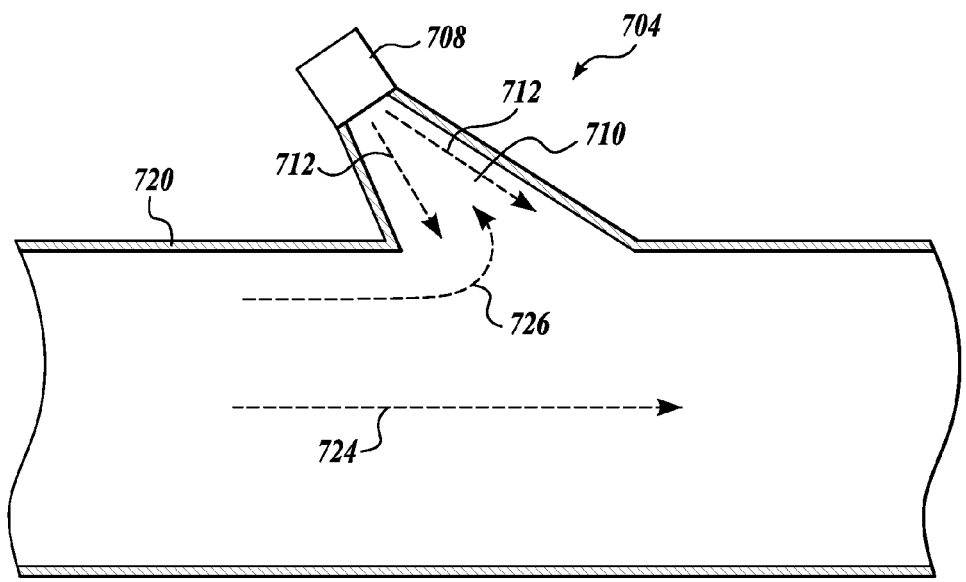
FIG. 7 is a diagrammatic representation of a prior art urea doser port mounted onto an exhaust pipe.

Turning now to FIG. 6, there is shown a schematic diagram of a diffusion apparatus, generally designated 602, associated with an exhaust pipe section 604 for providing improved injection of urea from a urea doser or injector 606 to an exhaust pipe. The diffusion apparatus includes a diffusion chamber 610 that introduces urea released from the injector 608 into the exhaust stream, generally designated 618. The diffusion apparatus 602 further includes a conduit defining a conduit chamber 622 connecting the interior of the exhaust pipe 604 to the diffusion chamber 610 such that exhaust gas 628 flows from the exhaust pipe 604 and into the entrance of the diffusion chamber 610 to aid in the transportation of injected urea 632 from the injector 608, through the diffusion chamber 610, and into the exhaust pipe 604. In some embodiments, the conduit chamber 622 can be specifically designed (e.g., changing the size, shape, and direction of flow), so that the redirected exhaust gas 628 can be controlled, for example, in direction and/or speed so as to optimize injection of urea through the diffusion chamber 610. Exemplary embodiments of such a conduit chamber 622 and related structures are described below with reference to FIGS. 1-5.

Referring now to FIGS. 1-5, an exemplary embodiment of a diffuser apparatus, generally designated 110, formed in accordance with aspects of the present disclosure will be described. As best shown in FIG. 1, the diffuser apparatus 110 is attached to a section of exhaust piping 112. The diffuser apparatus 110 is associated with a urea doser 114 to form a doser port that functions to inject a urea solution (or other nitrogen oxides reductant) into an exhaust stream 116 generated by an NOx producing engine (not pictured) and flowing through the exhaust pipe 112. During operation of the engine, the urea doser 114 injects urea, in liquid (droplet) form, through the diffusion apparatus 110 and into the exhaust stream passing through the exhaust pipe 112 to facilitate reduction of nitrogen oxides in the exhaust stream. The reduction occurs at a catalyst (not pictured) downstream from the exhaust pipe section 112.

Referring now to FIGS. 1 and 2, the urea doser 114 injects urea through the diffusion apparatus 110, which is disposed in-between the urea doser 114 and the exhaust pipe 112. Generally described, the diffusion apparatus 110 includes two chambers: a diffusion chamber 118, through which the urea spray passes upon injection; and a conduit chamber 120, which can control the direction and/or speed of the exhaust flow introduced into the diffusion chamber 118, as will be described in more detail below. In operation, the exhaust stream 116 generated by a nitrogen oxides-producing engine, such as a diesel engine, traverses the exhaust pipe 112. A portion 180 of the exhaust stream then travels through the conduit chamber 120 on the upstream side of the diffusion apparatus 110 from the diffusion chamber 118. The exhaust gas is then introduced to an inlet 132 of the diffusion chamber 118, which is in proximity of the urea injection location. By transporting exhaust gas from the exhaust pipe 112 to the diffusion chamber 118, the conduit chamber 120 performs a function analogous to that of the conduit chamber 622 of FIG. 6, as is described elsewhere herein.

The improved urea injection provided by the embodiments of the present disclosure may be better understood with reference to FIGS. 2-5. As best shown in FIGS. 2 and 4, the diffuser apparatus 100 comprises a housing 140, a diffuser 144, an upper baffle 148, and an optional lower baffle structure 150. As best shown in FIG. 2 the diffuser 144 is suspended within the housing 140, thereby forming the conduit chamber 120 therebetween. The upper baffle 148 is disposed at one end of the housing 140. The optional lower baffle 150 is spaced apart from the upper baffle 148 and surrounds an upper section of the diffuser 144.

Referring now to FIG. 3, the diffuser 144 defines the diffusion chamber 118. In the embodiment shown, the diffusion chamber 118 is frustoconical in shape and expands in diameter between an inlet 132 and an outlet 134. While the diffusion chamber 118 is conical as illustrated, this is an exemplary embodiment and not limiting. Any shaped chamber 118 is useful in the disclosed embodiments. In the illustrated embodiments, the diffusion chamber inlet 132 is positioned to receive injected urea from the urea doser (not pictured in FIGS. 2-5 for purposes of clarity). The injected urea then passes through the inlet 132, into the diffusion chamber 118, and out of the outlet 134 in a manner that reduces wall wetting.

It will be appreciated that the inlet 132 may be sized and positioned to optimize injection of urea received from the urea doser. In one embodiment, the inlet 132 is positioned adjacent, but not abutting, the urea doser 114 (FIG. 1). As will be described further below, a gap between the inlet 132 and the urea doser allows for the exhaust flow 180 to move past the urea doser and carry the injected urea into the inlet 132. It will be appreciated that in some embodiments the size of the inlet 132 can be suitably matched to the size of the urea doser and the related shape of urea spray injected by the doser so that the inlet 132 receives as much as the injected urea volume as possible. Similarly, in some embodiments, the diffusion chamber 118 can be sized and shaped to suitably match the shape of the injected urea spray such that the chances of urea impacting and wetting the walls of the diffusion chamber 118 is reduced or eliminated. In one embodiment, the geometry of the diffuser 144 can be tailored to closely match the spray characteristics of the urea doser such that the angle of the spread of the urea spray ("spray cone angle") is substantially mirrored by the diverging angle of the diffuser 144 to reduce the likelihood that the urea spray will impinge on the walls of the diffuser 130. In one embodiment, the diverging angle of the diffuser 144 is equal to or greater than the spray cone angle.

Turning now to FIGS. 5A and 5B, the outlet 134 of the diffusion chamber 118 may extend into the exhaust pipe 112. For example, in one embodiment, the outlet 134 of the diffusion chamber 118 extends beyond a line (not pictured) defined by the surface of the exhaust pipe 112. In that regard, the outlet 134 extends into the exhaust pipe 112 so as to project injected urea through the diffusion apparatus 110 and away from the walls of the exhaust pipe 112, thus reducing wall wetting. If the outlet 134 extends into the exhaust pipe 112, a localized region of high pressure is created, a process that is optionally facilitated by the fins 176, described further below. Such local high pressure prevents disruptions in exhaust gas flow through the diffuser 144 from the outlet 134 toward the inlet 132.

In some embodiments, the diffusion apparatus 110 may also include a baffle chamber 160 for controlling the flow of exhaust gas intermediate the conduit chamber 120 and the diffusion chamber 118, as shown in FIG. 2. The baffle chamber 160 is shown as being formed by the upper baffle structure 148 and the lower baffle structure 150. In an embodiment shown, the lower baffle structure 150 may be integrally formed or otherwise coupled to the diffuser 144. The lower baffle structure 150 extends radially outwardly and into sealing engagement with the housing 140. As such, the lower baffle structure 150 delimits the conduit chamber 120 between the housing 140 and the diffuser 144 on one side, and the baffle chamber 160 on the other side. The lower baffle structure 150 may further include holes 164 or other structure, such as slots or the like, for allowing exhaust gas, such as gas 180, to pass into the baffle chamber 160 from the conduit chamber 120.

The upper baffle structure 148 abuts against the end surface of the housing 140 and includes a urea doser opening 154. The urea doser opening 154 allows for a urea doser to be placed adjacent the inlet 132 of the diffusion chamber 118. The upper baffle structure 148 also includes a flange 156 surrounding the opening 154 and spaced radially outwardly from the end of the diffuser 144, thereby forming a gap 152. The end of the flange is spaced from the baffle 150, thereby forming a passageway that connects the baffle chambers 160 in fluid communication with the inlet 132. It will be appreciated that the positioning of the inlet 132 with respect to the doser allows exhaust gas to pass through the gap 152, past the urea doser injection point, and into the diffusion chamber 118. In some embodiments, the upper baffle structure 148 and the lower baffle structure 150 provide structural support for the diffuser 144 to be positioned for receiving urea from the urea doser and for extending the outlet 134 of the diffuser cone 144 into the exhaust pipe 112.

By directing exhaust gas flow 180 from the exhaust pipe 112 through the conduit chamber 120 and on to the diffusion chamber 118 via the baffle chamber 160, at least two events may occur that improve the spray of urea from the urea doser to the exhaust pipe 112. First, the exhaust flow 180 is directed such that the flow is in the direction of urea injection. Second, the exhaust flow provides an additional force in the direction of injection, which effectively transports even the slowly injected "last drops" of an injection cycle through the diffusion apparatus 110 and into the exhaust pipe 112.

The configuration of the diffusion apparatus 110 and/or baffle chamber 160 may also limit the volume and/or speed of exhaust flow 180 across the face of the urea doser. In the illustrated embodiments, the baffle chamber 160 directs exhaust flow 180 from the exhaust pipe 112 to the diffusion chamber 118 in a nonlinear path. In other embodiments, the exhaust flow 180 is directed to the chamber 118 in a manner that controls the speed of the exhaust flow. For example, exhaust gas from the conduit chamber 120 in the form of flow 180 flows into the baffle chamber 160 through one or more of metering holes 164, slots, or other perforations. In the illustrated embodiments, the plurality of holes 164 control the flow of exhaust gas into the baffle chamber 160. Both the size of the holes 164 and the number of holes 164 control the volume and/or speed of gas flowing into the baffle chamber 160, and may be selectively adjusted according to the particular application.

In some embodiments, the speed of the exhaust flow as it approaches the inlet 132 of the diffusion chamber 118 (and the injection site of the urea doser) may be also partially controlled by the shape of the baffle chamber 160. For example, the chamber 160 can be configured such that the exhaust flow 180 undergoes a series of turns in the baffle chamber 160 before passing through the urea doser opening 154 in the upper baffle structure 148, past the urea doser (not pictured in FIG. 2), and into the inlet 132 of the diffusion chamber 118. This non-linear path of the flow 180 directs and slows the exhaust gas prior to introduction into the inlet 132.

Limiting exhaust flow across the face of the urea doser can be important for at least two reasons. First, the urea doser has stringent temperature limitations. Subjecting the urea doser to excessive hot exhaust gas creates the risk of overheating the urea doser and compromising its operability. Accordingly, embodiments provided herein limit heat transfer from the hot exhaust gas to the injector 114. Second, excessive exhaust gas flow is less effective in clearing out the last drops of urea injected by the urea doser because high exhaust gas flow is less likely to produce an even flow into the inlet 132 of the diffusion chamber 118.

In the embodiment shown, the baffle chamber 160 is configured to reduce the likelihood of an uneven exhaust flow into the diffusion chamber 118 with regard to volume and direction. An uneven exhaust flow may result in the exhaust flow causing injected urea to miss the inlet 132 of the diffusion chamber 118 completely, or may alter the flight of injected urea such that the droplets impact the interior walls of the diffuser cone 144 and do not reach the exhaust pipe 112, as intended.

While the illustrated embodiments in FIGS. 1-5 include a baffle chamber 160 and a conduit chamber 120, the present disclosure is not limited to diffusion apparatus including such structures. For example, in FIG. 6, the conduit 622 directs exhaust flow 628 from the exhaust pipe 604 to the diffusion chamber 610, and no baffle chamber is included. The use of a baffle chamber 160 is included herein as one possible example that addresses one or more issues that may arise when introducing hot exhaust gas across the urea doser (e.g., damaging temperatures and excessive flow speed).

Referring now to FIGS. 2-4, embodiments of the diffuser apparatus 110 may additionally include one or more fins 176 disposed around the diffuser chamber 144. The fins 176 create a local region of high pressure in the exhaust flow during operation of the exhaust system and are employed to aid in preventing disruptions in the exhaust gas motion (e.g., flow in the diffuser 144 from the outlet 134 toward the inlet 132) and to promote the flow of "clean" (i.e., no urea) exhaust gas into the conduit chamber 120. In the illustrated embodiments, the fins 176 are mounted externally near the outlet 134 of the diffuser cone 144 so as to project into the exhaust pipe 112. Additionally, the fins 176 help to center and support the cone 144 in the exhaust pipe 112 during operation.

The illustrated embodiments include a diffuser 144 that extends into the exhaust pipe 112, as has been described above. Extending the diffuser 144 into the exhaust pipe 112 keeps the exhaust gas velocity within the diffusion chamber 118 quiet. However, extending the diffuser 144 into the exhaust pipe 112 may create a potential problem: formation of a recirculation "bubble" (e.g., in the downstream portion of the diffusion chamber 118) that may direct a flow of exhaust toward the inlet 132 of the diffusion chamber 118, thus impeding the spray of urea solution into the exhaust pipe 112. To mitigate this effect, an anti-recirculation port 190 can be added at the outlet 134 of the diffusion chamber 118. The anti-recirculation port 190 is a cut-away portion of the diffuser 144 that operates to bleed off some exhaust gas flow and reintroduces it into the exhaust pipe 112 downstream from the diffusion chamber 118. This "down-wash" of urea-free exhaust gas effectively mitigates the recirculation effect. In the illustrated embodiments of FIGS. 1-5 the recirculation port 190 is parabolic, although other shapes may be used to carry out the one or more desired functions, such as a circular or elliptical cutout or the like.

Referring now to FIG. 3, the diffusion apparatus 110 is mounted at an angle $\theta_1$ relative to the direction of the exhaust flow 116. The angle $\theta_1$ can be varied based on one or more design parameters: the angle at which the urea is injected ($\theta_2$; based on the injection axis 194 compared to the direction of exhaust flow 116), the shape of the diffusion chamber 118, and the shape of the conduit chamber 120. In one embodiment, angle $\theta_1$ is equal to $\theta_2$. In other embodiments, angle $\theta_1$ may be in the range of between 20° and 90°. In another embodiment, $\theta_1$ is from 10-50°. In one embodiment, $\theta_1$ is grater than ½ the spray cone angle.

The diffusion apparatus 110 can be manufactured using materials and methods known to those of skill in the art. In a representative embodiment, the materials used to manufacture the various components of the diffusion apparatus 110 are metals, so as to withstand the high temperatures experienced by the diffusion apparatus 110 resulting from the hot exhaust gas. However, it will be appreciated that temperature-resistant polymers, ceramics, or other such materials known to those of skill in the art, can also be used for diffusion apparatus construction. The diffusion apparatus 110 may be manufactured in a monolithic fashion, wherein the diffuser 144 and the housing 140 are a unitary piece of material. However, the exemplary embodiments illustrated herein are manufactured in three separate pieces: a housing 140; a diffuser 144, and an upper baffle structure 148. The three separate pieces of the diffusion apparatus 110 may be suitable joined by any appropriate technique, such as welding, mechanical fasteners, etc.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A diffusion apparatus configured to provide liquid communication between an injection port for injecting a reductant solution and an exhaust pipe connected to an engine that produces an exhaust flow, the diffusion apparatus comprising:
   (a) a diffusion chamber configured to pass the reductant solution from the injection port to the exhaust pipe, the diffusion chamber having an inlet and an outlet, wherein the inlet is an opening configured to be in fluid communication with the injection port, and wherein the outlet is an opening configured to be in fluid communication with an interior of the exhaust pipe;
   (b) a conduit configured to direct a portion of the exhaust flow from the exhaust pipe to the inlet of the diffusion chamber, the conduit comprising a conduit chamber partially surrounding the diffusion chamber; and
   (c) a baffle structure defining a baffle chamber intermediate the inlet of the diffusion chamber and the conduit, the baffle chamber receiving the portion of the exhaust flow from the conduit and discharging the portion of the exhaust flow to the diffusion chamber, the baffle structure comprising at least one aperture, the aperture being configured so that the exhaust flow moves from the conduit chamber to the baffle chamber through the at least one aperture.

2. The diffusion apparatus of claim 1, wherein the diffusion chamber outlet is positioned within the interior of the exhaust pipe.

3. The diffusion apparatus of claim 1, wherein the diffusion chamber is substantially frustoconical, diverging in diameter from the inlet to the outlet.

4. The diffusion apparatus of claim 1, wherein the diffusion chamber is oriented at a first angle relative to the exhaust pipe.

5. The diffusion apparatus of claim 1, wherein the conduit chamber is cylindrical.

6. The diffusion apparatus of claim 1, wherein the conduit chamber comprises an opening configured to allow for liquid communication between the injection port and the inlet of the diffusion chamber.

7. The diffusion apparatus of claim 1, wherein the baffle structure restricts the exhaust flow from the exhaust pipe, through the conduit chamber, and into the inlet of the diffusion chamber, wherein restricting the exhaust flow comprises one of the effects consisting of reducing the heat transferred from the exhaust flow to the injection port, reducing the speed of the exhaust flow, and combinations thereof.

8. The diffusion apparatus of claim 1, wherein the baffle structure comprises a plurality of openings that restrict the exhaust flow from the exhaust pipe to the inlet of the diffusion chamber.

9. The diffusion apparatus of claim 1, wherein the baffle structure comprises a non-linear path to restrict the exhaust flow from the exhaust pipe to the inlet of the diffusion chamber.

10. The diffusion apparatus of claim 1, wherein the baffle structure is configured to direct the exhaust flow past the injection port and into the inlet of the diffusion chamber.

11. The diffusion apparatus of claim 1 further comprising a protrusion extending from the outlet of the diffusion chamber into the exhaust pipe, wherein the protrusion is configured to produce a localized area of elevated exhaust gas pressure adjacent to the protrusion during operation of the engine.

12. The diffusion apparatus of claim 11, wherein the protrusion comprises one or more fins.

13. The diffusion apparatus of claim 11, wherein the one or more fins protrude longitudinally into the exhaust pipe against the exhaust flow.

14. The diffusion apparatus of claim 1 further comprising an anti-recirculation port.

\* \* \* \* \*